(12) United States Patent
Wollschlaeger

(10) Patent No.: US 6,186,021 B1
(45) Date of Patent: Feb. 13, 2001

(54) MANUAL TRANSMISSION SHIFTER

(75) Inventor: Gerd Wollschlaeger, Overath (DE)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/084,272

(22) Filed: May 26, 1998

(30) Foreign Application Priority Data

May 6, 1997 (DE) .............................................. 197 23 507
May 13, 1998 (EP) ................................................ 98108687

(51) Int. Cl.⁷ .................................................. B60K 20/00
(52) U.S. Cl. ............................ 74/473.22; 74/493; 74/527
(58) Field of Search ........................... 74/473.22, 473.21, 74/473.24, 473.25, 473.28, 473.36, 473.37, FOR 102, FOR 103, 493, 527

(56) References Cited

U.S. PATENT DOCUMENTS

| 4,244,236 | * | 1/1981 | Sylvester | 74/527 X |
| 4,919,242 | * | 4/1990 | Muramatsu et al. | 74/473.21 X |
| 5,078,242 | * | 1/1992 | Ratke et al. | 477/96 |
| 5,651,290 | * | 7/1997 | Osborn et al. | 74/473.22 |

FOREIGN PATENT DOCUMENTS

| 1925642 | * | 5/1978 | (DE) . |
| 3913269 | | 10/1990 | (DE) . |

* cited by examiner

Primary Examiner—David A. Bucci
Assistant Examiner—Marcus Charles
(74) Attorney, Agent, or Firm—Frank G. McKenzie

(57) ABSTRACT

A shifter for a manual transmission is provided in which a shifter shaft is rotatably supported about an axis. A radial arm is carried for rotation about the axis by the shifter shaft. A shifter pin is provided on an axis substantially parallel the axis of the shifter shaft. The shifter pin is supported by the radial arm and has one cross section with a first thickness and a second cross section having a second thickness. A substantially planar plate is fixed to the transmission housing radially spaced from the axis. A shift gate is provided in the plate. The shift gate has an arcuate slot with a length, a first width, and a second width longitudinally spaced from the first width. The shift gate is engaged by the shifter pin.

15 Claims, 3 Drawing Sheets

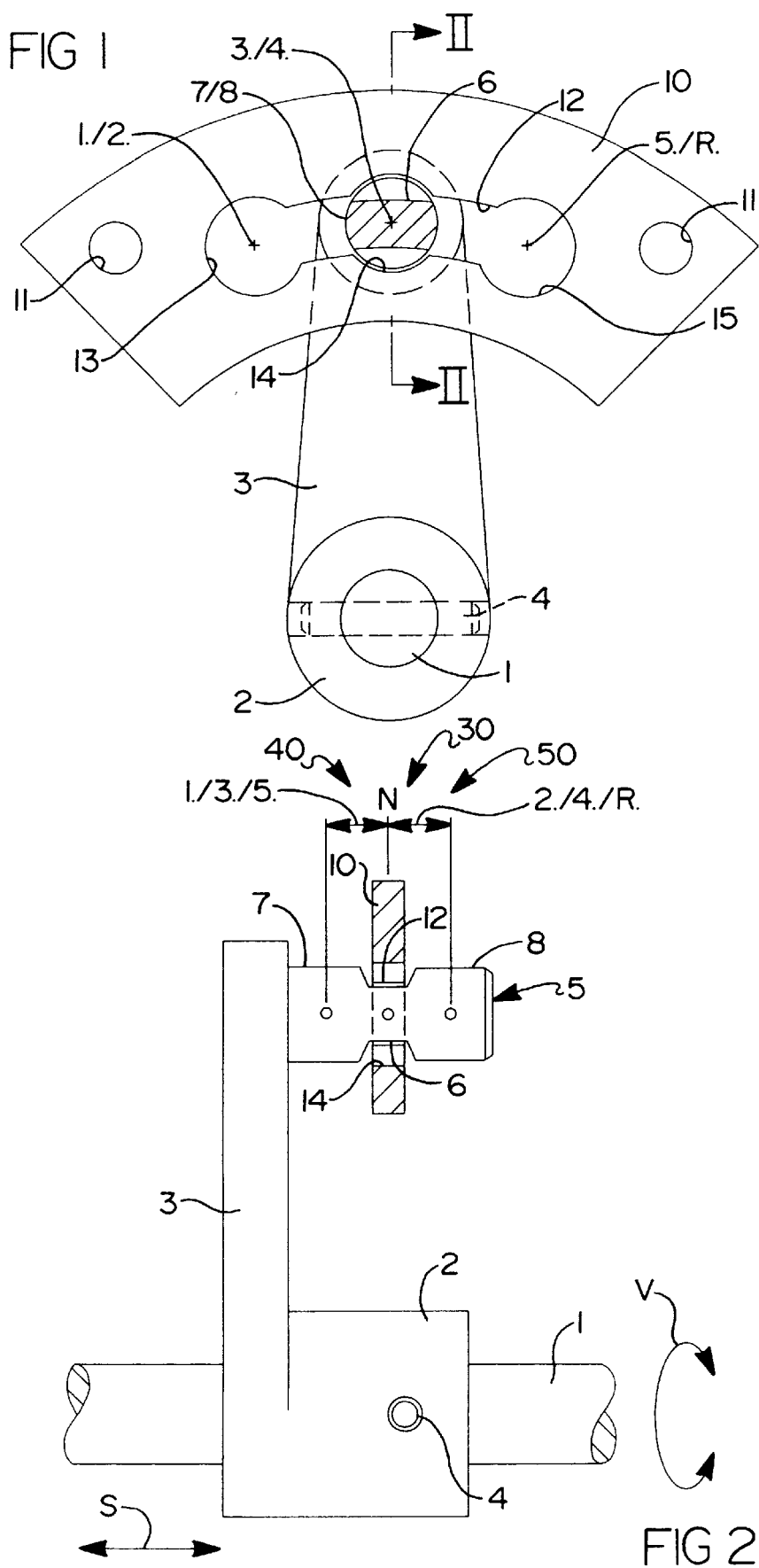

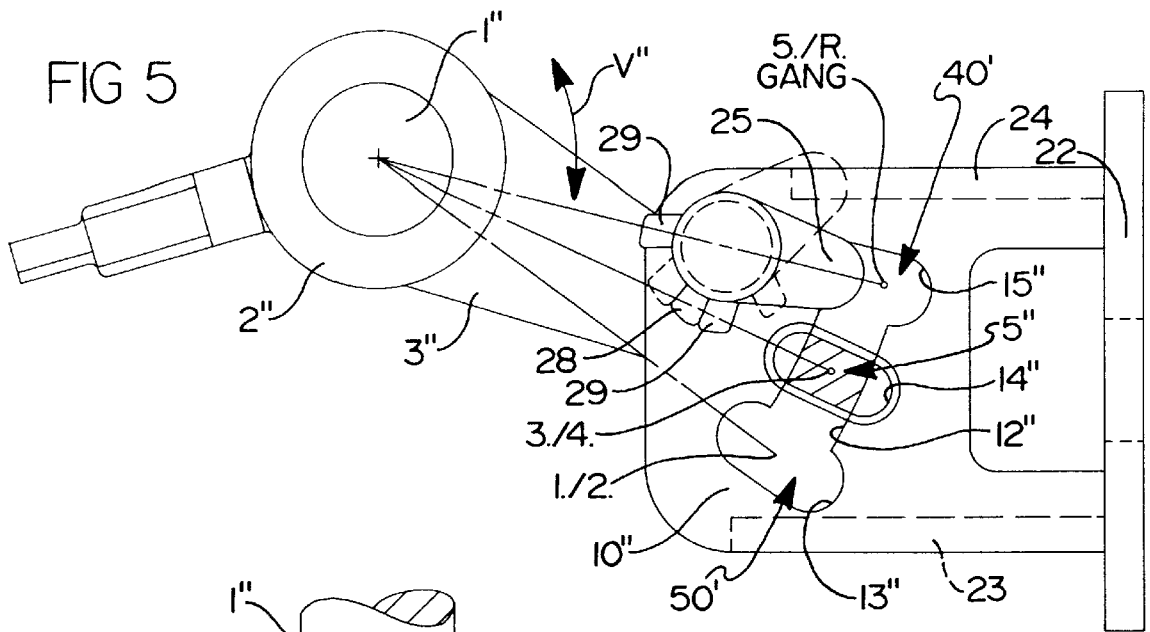
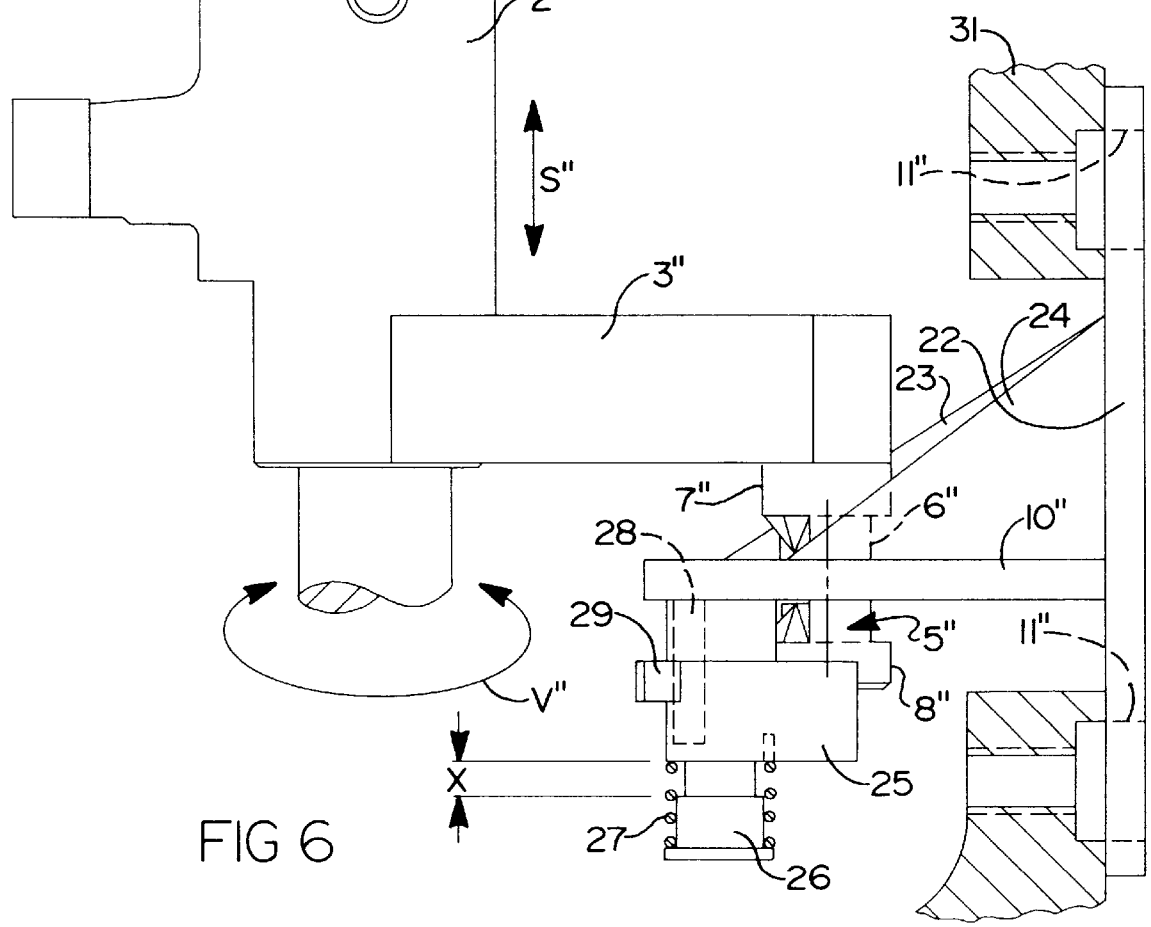

MANUAL TRANSMISSION SHIFTER

FIELD OF THE INVENTION

The invention relates to a shifter for a manual transmission, particularly a shifter including a gate for a shifter pin, the pin mounted on a shifter shaft of the manual transmission, and the gate being fixedly mounted in a transmission housing and which cooperates with the shifter pin to guide the pin.

BACKGROUND AND PRIOR ART

A shifter is disclosed in German patent 39 13 269 ('269 patent), best illustrated in FIGS. 2–5 thereof. In the '269 patent, a shifter pin is fitted on the shifter shaft and cooperates with slots in a flat shift gate, which is fixedly mounted in the transmission housing.

The shift gate of the '269 patent has the disadvantage that even if, for example, to reduce the amount of space required, it is curved in the shape of a circular arc (best seen in FIGS. 4 and 5 at 25, 26, 27) and therefore takes up a large amount of room within the transmission housing.

OBJECT OF THE INVENTION

The object of the invention is to design a shift gate of the above-mentioned kind in such a way that it can be realised at less cost in space and material.

SUMMARY OF THE INVENTION

To this end, in accordance with the invention, the shifter pin is arranged parallel to the shifter shaft by means of a radial arm and exhibits axial sections of different diameter, and the shift gate is in the form of a flat plate arranged in a plane radial to the shifter shaft and has an arcuate slot in it which in the circumferential direction exhibits sections of different widths. In this way, a shift gate can be provided which is very economical in both space and material.

In one embodiment of the invention, the shifter pin is in the form of a substantially cylindrical shifter pin with a middle section having a cross-section of reduced thickness which determines the neutral or preselection plane and the arcuate slot is formed with three wider circular portions which determine the shift lanes.

In another embodiment of the invention, the shifter pin is in the form of a substantially cylindrical shifter pin having two disc-shaped thicker portions spaced from one another and the arcuate slot is formed with only one central wider portion which determines the neutral or preselection plane.

In a further embodiment of the invention, the shifter pin has a cross-section departing from the cylindrical and the arcuate slot is formed with sections of different width such that the wider portions are adapted to the cross-section of the shifter pin.

In yet another embodiment of the invention, a locking pawl is provided on a pin on the shift gate which is axially displaceable to a limited extent counter to the force of a coil torsion spring and is radially pivotable to an extent limited by means of a stop on the pin and stops on the locking pawl, the locking pawl forming a reverse gear block which prevents direct shifting from 5th gear into reverse gear.

BRIEF DESCRIPTION OF THE DRAWINGS

The invention will be described in more detail with reference to embodiments shown in the accompanying drawings, in which:

FIG. 1 is a view of a shift gate in accordance with the invention, in the direction of the shifter shaft;

FIG. 2 is a side view of the embodiment shown in FIG. 1, with a section through the shift gate along the line II—II.

FIG. 5 shows a practical embodiment of the shift gate in accordance with the invention in a view along the axis of the shifter shaft, including a reverse gear block; and FIG. 6 is a side view of the shift gate of FIG. 5 showing the parts of the reverse gear block.

DETAILED DESCRIPTION OF PREFERRED EMBODIMENTS

Figure 3:
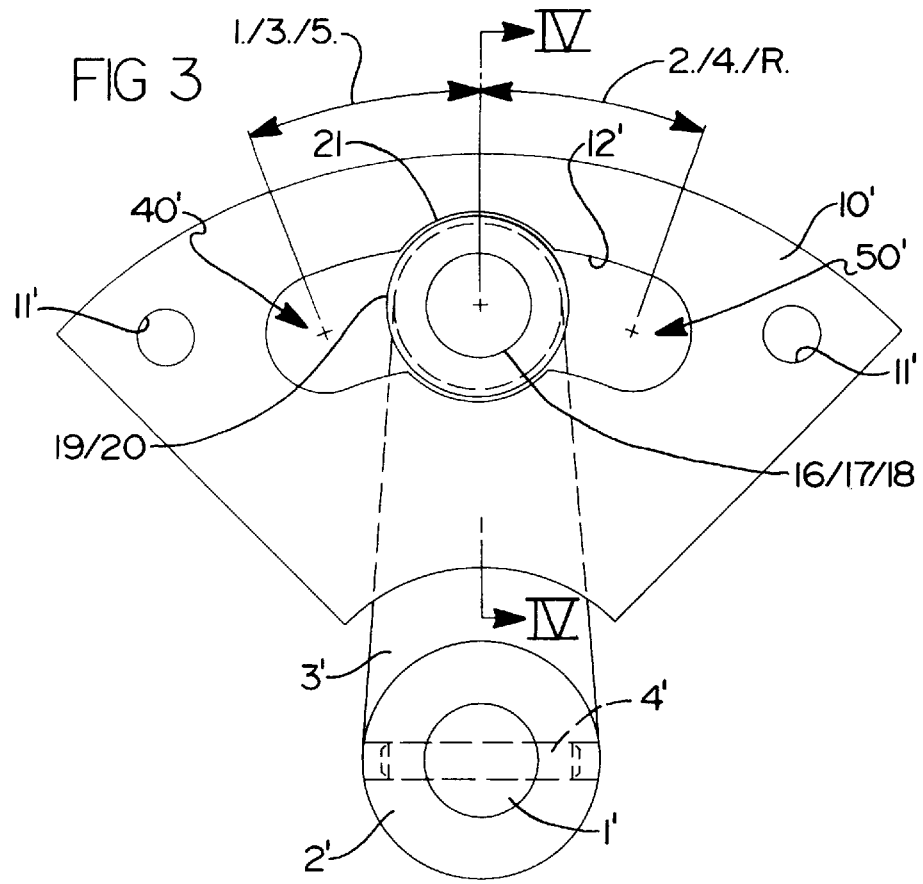
FIG. 3 is a view along the axis of the shifter shaft of a second embodiment of the shift gate in accordance with the invention.

In the accompanying drawings, the shift gate for a shifter pin mounted on a shifter shaft of a manual transmission is shown essentially in principle, that is to say, the corresponding gearwheels and the transmission housing are omitted.

A hub 2 carrying a radial arm 3 is mounted fixedly on a shifter shaft 1, e.g., by means of a grooved pin 4. The free end of the radial arm 3 is provided with a shifter pin 5 which extends parallel to the shifter shaft 1 and exhibits at least three axial sections with different cross-sections 6, 7 and 8, of which the cross-section 6 is preferably not circular but as shown by hatching in FIG. 1 is flattened and represents the neutral position N 30 in the shift pattern. Thereby, the stability of the shifter pin 5 is increased and at the same time a lateral stop is provided in the shift gate for 1st and 2nd gears or 5th and reverse gears. The cross-sections 7 and 8 of the shifter pin 5 preferably exhibit a circular form and determine the engagement positions in the shift pattern.

In FIG. 2 the direction of the radial preselection movement and the direction of the axial engagement movement of the shifter shaft 1 are shown by the arrows V and S, respectively. In this embodiment, preselection takes place by radial pivoting of the shifter shaft 1, as indicated by the arrow V, and the gears are engaged by axial displacement of the shifter shaft 1, as indicated by the arrow S.

A shift gate 10 in the form of a flat plate is arranged in a plane radial to the shifter shaft 1 and can be fixed in position in the transmission housing (not shown) by suitable fastening means, e.g., by means of two bores 11, through which a bolt (not shown) is driven to secure the gate 10 to the housing.

The shift gate 10 exhibits an arcuate slot 12 which in the circumferential direction exhibits portions having sections 13, 14 and 15 of greater width. If the shifter pin 5 is situated with its middle, as illustrated in FIG. 2, the portion of the pin 5 having reduced thickness, section 6 in the radial plane of the shift gate 10, the shifter shaft 1 can be pivoted radially to execute a preselection movement V. Once the shifter pin 5 is located in one of the sections 13, 14 or 15, the shifter shaft 1 can be moved axially in order to execute an engagement movement S to neutral (N) 30 or to a position 40, 50 to engage a particular gear. The sections 13, 14 and 15 of the slot 12 of the shift gate 10 thus respectively determine the shift lanes for 1st and 2nd gears, 3rd and 4th gears, and 5th and reverse gears.

Figure 4:
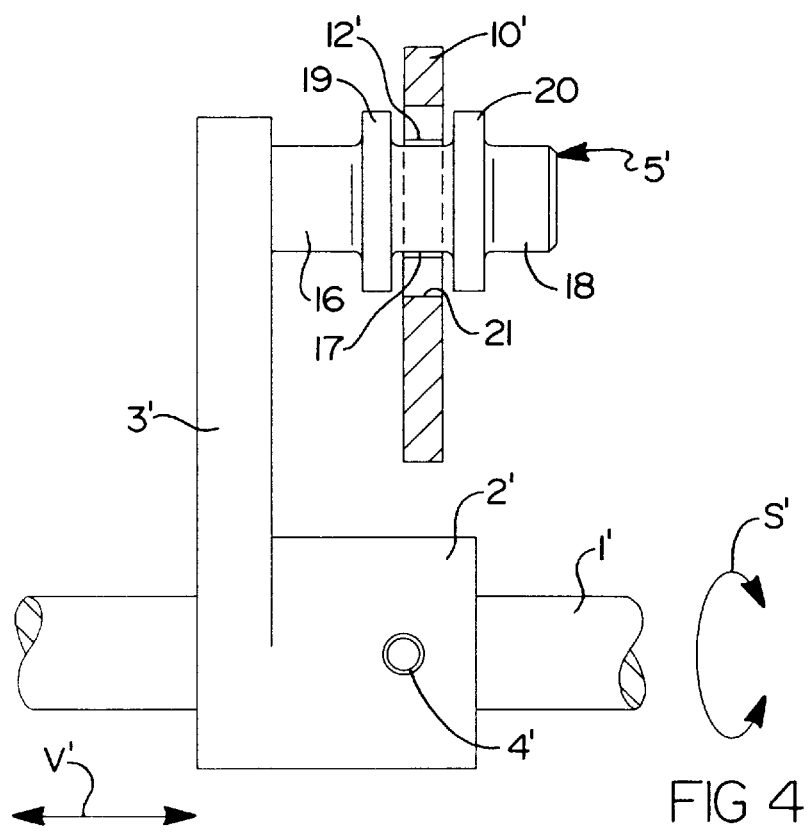
FIG. 4 is a side view of the shift gate shown in FIG. 1, with a section through the shift gate along the line IV—IV.

In FIGS. 3 and 4 a further embodiment of a shift gate in accordance with the invention for a shifter pin 5' carried on a shifter shaft 1' of a manual transmission is shown, in which corresponding parts of the device are given the same reference symbols but indexed with a prime. In this embodiment, the shifter shaft 1' is displaceable in the direction of the arrow V' for preselection of a shift lane, and is radially pivotable in the direction of the arrow S' to engage a gear.

On the shifter shaft 1', a radial arm 3 on a hub 2' is again fixed by means of a grooved pin 4'. Mounted at the free end of the radial arm 3', there is a shifter pin 5' which exhibits a plurality of axial sections of different diameters, three smaller-diameter sections 16, 17 and 18 being provided which are separated from one another by two disc-like thicker portions 19 and 20 having a greater cross-section than the sections 16, 17, 18.

The shift gate 10' is again arranged as a flat plate in a plane radial to the shifter shaft 1', and exhibits an arcuate slot 12' which, except for a middle section 21 of greater width, extends to the left and right with a smaller width which is adapted to the smaller axial sections 16, 17 and 18 on the shifter pin 5.

If the shifter shaft 1' is situated with its radial arm 3' in its middle position, as shown in FIG. 3, in which the disc-like thicker portions 19 and 20 correspond to the wider section 21 of the arcuate slot 12' of the shift gate 10', preselection of the shift lanes for 1st and 2nd gears, 3rd and 4th gears, and 5th and reverse gears can take place by axial displacement of the shifter shaft 1' along the arrow V'.

Once the appropriate shift lane has been selected (at 16 or 18) by moving in the direction of the arrow V', the shifter shaft 1' may be pivoted along the arrow S' to execute an engagement movement, since the smaller sections 16, 17 and 18 of the shifter pin 5' can move along the narrower lateral regions (outside 21) of the arcuate slot 12' of the shift gate into the respective left or right radial end position 40', 50'.

FIGS. 5 and 6, a further alternative embodiment of the shift gate in accordance with the invention is shown which is adapted to an existing transmission, wherein similar parts are labelled with the same reference symbols except for the addition of a double prime. In this case, the shifter shaft 1" is radially pivotable in the direction of the arrow V" to preselect a shift lane 40", 50", and is axially displaceable in the direction of the arrow S" to engage a gear.

Again, a radial arm 3" is fixed to the shifter shaft 1", via a hub 2", by means of a grooved pin 4". A shifter pin 5" is mounted at the free end of the radial arm 3". The pin 5" exhibits at least three axial sections having different cross-sections 6", 7" and 8". The section 6" represents the neutral position N 30 in the shift pattern, while the sections 7" and 8" indicate the engagement positions in the shift pattern.

A shift gate 10" in the form of a flat plate is arranged in a plane radial to the shifter shaft 1" in which it can be fixed to the transmission housing 31 by means of two bores 11", the shift gate 10" being in this case mounted on a base plate 22 and supported by triangular side webs 23 and 24.

The shift gate 10" exhibits an arcuate slot 12" which in the circumferential direction exhibits sections 13", 14" and 15" of greater width.

If the shifter pin 5" is located with its middle, smaller cross-section section 6" in the radial plane of the shift gate 10", the shifter shaft 1" can be pivoted radially to execute a preselection movement as indicated by arrow V". Once the shifter pin 5" is located in one of the sections 13", 14" or 15", the shifter shaft 1" can be moved axially to execute an engagement movement, as indicated by arrow S".

The sections 13", 14" and 15" of the arcuate slot 12" of the shift gate 10" thus determine the shift lanes for 1st and 2nd gears, 3rd and 4th gears, and 5th and reverse gears.

Since with this design of the manual transmission 5th gear and reverse gear lie in the same shift lane, a reverse gear block which prevents unintentional engagement of reverse gear in case of a shifting movement from 5th gear towards 4th gear must be provided in known manner.

A preferred embodiment of a reverse gear block consists essentially of a locking pawl 25, mounted on a cylindrical pin 26 which is fastened to the shift gate 10", which exhibits a plurality of stops and can both be displaced axially and pivoted radially. The locking pawl 25 is held in a definite rest position by a coil spring 27. A stop member 28 (shown in broken lines in its longitudinal extension in FIG. 6) is fixed securely to the pin 26 and stop lugs 29 are fixed securely to the locking pawl 25. These elements ensure, first of all, a definite radial rest position of the locking pawl, and second, a definite maximum departure of the locking pawl from the rest position.

The function of the reverse gear block will now be explained. If the shifter pin 5", which is located in its axial neutral position, is pivoted radially into the shift lane of 5th gear and reverse gear, it moves the locking pawl from its neutral position, shown in full lines, into its radial end position, which is shown in broken lines. The coil torsion spring 27 is thereby tensioned and exerts a torsional force on the locking pawl 25. If the shifter pin 5" now moves in the direction of engagement of 5th gear, the locking pawl springs back into its starting position.

If on disengagement of 5th gear the shifter pin 5" then moves axially towards reverse gear, the front end of the shifter pin 5" meets the corresponding face of the locking pawl 25 and carries the pawl with it in the axial direction until it strikes the shoulder of the pin 26 and thus blocks shifting from 5th gear directly into reverse gear. The shifter pin 5" can however move radially from this position in the direction of the shift lane for 3rd and 4th gears, so that a subsequent downshift into 4th gear can take place.

If reverse gear is to be engaged, the shifter pin 5" executes a radial pivoting movement in order to select the shift lane of 5th gear and reverse gear. The locking pawl 25 is thus turned from its rest position into its pivoted end position and in doing so again pre-tensions the coil torsion spring member 27. The shifter pin 5" can now be moved in the axial direction for engagement of reverse gear, without being hindered by the locking pawl. Disengagement of reverse gear takes place in reverse order.

The coil torsion spring 27 is fixed on the one side to the pin 26 and on the other side to the locking pawl 25 such that it exerts both an axial and a radial spring force on the locking pawl 25 and permits an axial displacement of the locking pawl along the path X.

For the other embodiments of the shift gate shown in FIGS. 4 and 5, a person skilled in the art can, of course, design another correspondingly adapted reverse gear block.

It is to be understood that the embodiments of the invention described above are merely illustrative of application of the principles of the present invention. Numerous modifications may be made to the methods and apparatus described above without departing from the true spirit and scope of the invention.

What is claimed is:

1. A shifter for a manual transmission encased within a housing, the shifter comprising:

a shifter shaft rotatably supported about and movable along a first axis;

a radial arm carried for rotation about the first axis by the shifter shaft;

a single shifter pin having a length along a second axis substantially parallel the first axis, the shifter pin is rigidly supported by the radial arm, said shifter pin having a first cross section with a first thickness and a second cross section spaced along the second axis from the first cross section having a second thickness, said shifter pin being integral, unitary and one-piece;

a substantially planar plate fixed to the transmission housing radially spaced from the first axis, the plate having a shift gate provided therein, the shift gate comprising an arcuate slot in the plate having a length, a first width, and a second width longitudinally spaced from the first width, the shift gate engaged by the shifter pin.

2. A shifter as claimed in claim 1, further comprising:

said shifter pin having longitudinally spaced sections of different cross-sections, a first section having a first cross section with a first thickness, a second section having a second cross section with a second thickness less than the first thickness, the second section determining a neutral or preselection plane; and the first width of the slot having a width greater than the second thickness of the pin and less than the first thickness of the pin, the second width of the slot having a width greater than the first thickness of the pin, the second width providing a shift lane.

3. A shifter as claimed in claim 1, wherein the shift gate further comprises:

a first section of the shifter pin comprises a reduced section, and a second section provided between two longitudinally spaced sections of greater thickness;

the arcuate slot comprises the first section provided between two arcuately spaced sections of lesser width, the first section determining a neutral or preselection plane.

4. A shifter as claimed in claim 2, wherein the arcuate slot comprises three slot sections, each slot section having a substantially circular shape in the plane of the plate, the three slot sections interconnected by two arcuate connecting slots having a lesser width than the width of the circular shaped slot sections.

5. A shifter as claimed in claim 3, wherein the arcuate slot comprises the first slot section having a substantially circular shape interposed between and connected to two substantially arcuate slot.

6. A shifter as claimed in claim 5, wherein the pin comprises a substantially cylindrical pin, the second thickness of the pin comprises a substantially flat portion provided between the two longitudinally spaced sections.

7. A shifter for a manual transmission encased within a housing, the shifter comprising:

a shifter shaft rotatably supported about and movable along a first axis;

a radial arm carried for rotation about the first axis by the shifter shaft;

a shifter pin having a length along a second axis substantially parallel the first axis, the shifter pin is rigidly supported by the radial arm, said shifter pin having a first cross section with a first thickness and a second cross section spaced along the second axis from the first cross section having a second thickness;

a substantially planar plate fixed to the transmission housing radially spaced from the first axis, the plate having a shift gate provided therein, the shift gate comprising an arcuate slot in the plate having a length, a first width, and a second width longitudinally spaced from the first width, the shift gate engaged by the shifter pin;

said shifter pin having longitudinally spaced sections of different cross-sections, a first section having a first cross section with a first thickness, a second section having a second cross section with a second thickness less than the first thickness, the second section determining a neutral or preselection plane; and the first width of the slot having a width greater than the second thickness of the pin and less than the first thickness of the pin, the second width of the slot having a width greater than the first thickness of the pin, the second width providing a shift lane;

wherein the arcuate slot comprises three slot sections, each slot section having a substantially circular shape in the plane of the plate, the three slot sections interconnected by two arcuate connecting slots having a lesser width than the width of the circular shaped slot sections; and wherein the pin comprises a substantially cylindrical pin, the second thickness of the pin comprises a first pin portion provided between two ends of the pin, the first pin portion having a thickness less than the width of the two connecting slots, the ends of the pin having a thickness greater than the connecting slots and less than the width of the circular shaped slot sections.

8. A shifter as claimed in claim 7, wherein the first pin portion comprises a substantially flat portion.

9. A shifter as claimed in claim 8, further comprising a locking pawl means supported by the plate for preventing inadvertent shifting from a $5^{th}$ gear position into a reverse gear position.

10. A shifter as claimed in claim 9, wherein the locking pawl comprises:

a pawl pin supported by the plate;

a pawl supported by the pawl pin for rotation;

a spring means for rotationally positioning the pawl; and a stop means provided on the pin and pawl to prevent rotation of the pawl past a predetermined position.

11. A shifter as claimed in claim 10, wherein the pawl is supported for translation relative to the pawl pin and is urged against translation by the spring means.

12. A shifter for a manual transmission encased within a housing, the shifter comprising:

a shifter shaft rotatably supported about and movable along a first axis;

a radial arm carried for rotation about the first axis by the shifter shaft;

a shifter pin having a length along a second axis substantially parallel the first axis, the shifter pin is rigidly supported by the radial arm, said shifter pin having a first cross section with a first thickness and a second cross section spaced along the second axis from the first cross section having a second thickness;

a substantially planar plate fixed to the transmission housing radially spaced from the first axis, the plate having a shift gate provided therein, the shift gate comprising an arcuate slot in the plate having a length, a first width, and a second width longitudinally spaced from the first width, the shift gate engaged by the shifter pin;

the first section of the shifter pin comprises a reduced section, the second section provided between two longitudinally spaced sections of greater thickness;

the arcuate slot comprises the first section provided between two arcuately spaced sections of lesser width, the first section determining a neutral or preselection plane, wherein the arcuate slot comprises the first slot section having a substantially circular shape interposed between and connected to two substantially arcuate slot;

wherein the pin comprises a substantially cylindrical pin, the second thickness of the pin comprises a substantially flat portion provided between the two longitudinally spaced sections; and wherein the pin further comprises a pair of end portions of lesser thickness than the longitudinally spaced sections, one of each of the longitudinally spaced portions provided between the substantially flat portion and one of the end portions.

13. A shifter as claimed in claim 12, further comprising a locking pawl means supported by the plate for preventing inadvertent shifting from a $5^{th}$ gear position into a reverse gear position.

14. A shifter gate as claimed in claim 13, wherein the locking pawl comprises:

a pawl pin supported by the plate;

a pawl supported by the pawl pin for rotation;

a spring means for rotationally positioning the pawl; and a stop means provided on the pin and pawl to prevent rotation of the pawl past a predetermined position.

15. A shifter as claimed in claim 14, wherein the pawl is supported for translation relative to the pawl pin and is urged against translation by the spring means.

* * * * *